(Model.)

L. J. RICHARDSON.
Device for Leveling Billiard and other Tables, &c.

No. 233,552. Patented Oct. 19, 1880.

WITNESSES
Fred G. Dieterich
Albert H. Krause

INVENTOR:
Levi J. Richardson
by Louis Bagger & Co.
ATTORNEYS.

UNITED STATES PATENT OFFICE.

LEVI J. RICHARDSON, OF MONTVILLE, MASSACHUSETTS.

DEVICE FOR LEVELING BILLIARD AND OTHER TABLES, &c.

SPECIFICATION forming part of Letters Patent No. 233,552, dated October 19, 1880.

Application filed April 14, 1880. (Model.)

*To all whom it may concern:*

Be it known that I, L. J. RICHARDSON, of Montville, in the county of Berkshire and State of Massachusetts, have invented certain new and useful Improvements in Devices for Leveling Billiard and other Tables, &c.; and I do hereby declare that the following is a full, clear, and exact description of the invention, which will enable others skilled in the art to which it appertains to make and use the same, reference being had to the accompanying drawings, which form a part of this specification, and in which—

Figure 1:
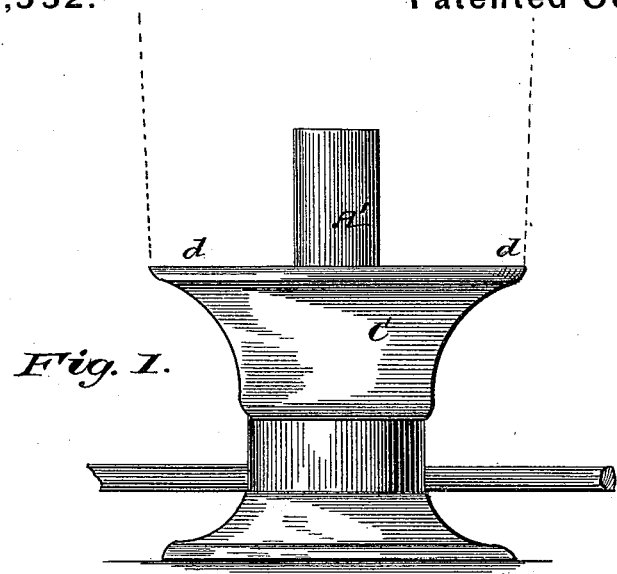
Figure 3:
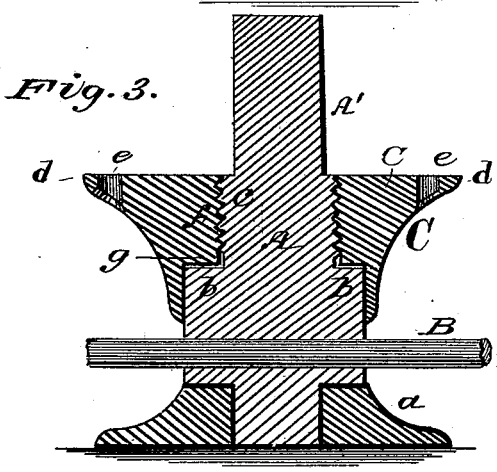
Figure 2:
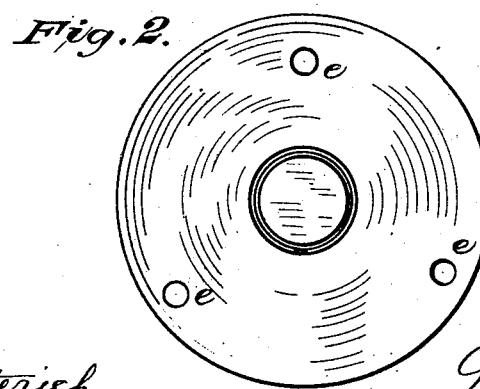

Figure 1 is a side view of my improved leveling device. Fig. 2 is a plan view, and Fig. 3 is a vertical section, of the same.

This invention contemplates improvements in devices for leveling articles of furniture, more particularly billiard-tables, pianos, organs, shuffle-boards, or other similar heavy or light articles, in a very simple, expeditious, and effectual manner; and it consists of a screw-threaded and shouldered spindle adapted to be turned in the furniture-leg and a foot resting upon the floor, combined with a fixed sleeve or nut having a screw-threaded passage, with a communicating socket to receive the shoulder of the spindle, substantially as hereinafter more fully set forth.

In the accompanying drawings, A marks a spindle or upright shaft, with its lower end let into and bearing in an apertured or socketed foot or base plate, *a*. The spindle A is provided above that portion entering the apertured or socketed step *a* with an enlargement or shoulder, *b*, for its nut to rest on when at its lowest point, while above the shoulder *b* it is provided with a screw-threaded portion, *c*. Through the enlargement or shoulder *b* is inserted a lever, B, for turning the shaft or spindle in the required direction, either up or down, in adjusting the height of or leveling the superposed article.

C is a nut or sleeve, preferably annular, and flanged, as shown, at its upper end, with said flange *d* provided with countersunk apertures *e*, for the screws or other means of fastening which connect it to the leg of the article of furniture.

The passage through the nut C is screw-threaded, as at *f*, about half-way through it, to fit upon the screw-threaded portion *c* of the spindle A, while the lower remaining portion of its passage is enlarged into a socket, *g*, to cause it to fit down upon and around the enlargement or shoulder *b* of the spindle A, but not to that extent to interfere with the lever passing through said shoulder.

It will be noticed that while the shoulder formed by the socket *g*, in connection with the shoulder *b* on the spindle, limits the movement in one direction of the nut C, the downward-extended wall of the socket *g* serves to conceal from view the threaded portion of the spindle and to exclude dust, &c., therefrom.

With the nut properly adjusted in position upon the spindle A it will be observed that the latter extends a greater or less distance above it, as at A'. This portion of the spindle is inserted or let into the leg of the article of furniture to properly secure it therein, but not so as to prevent it from turning when acted upon by the lever.

With this device adjusted to the leg of the piano, billiard-table, shuffle-board, organ, or other article needing leveling, as above described, and by turning the spindle or shaft by the lever, it can be quickly, easily, and effectually leveled.

Having thus fully described my invention, I claim and desire to secure by Letters Patent of the United States—

The combination, with the spindle A, having the screw-thread *c* and shoulder *b*, with its upper end adapted to fit into a leg of furniture and its lower end fitted into a step, *a*, resting upon the floor or foundation, of the lever B and the sleeve or nut C on the leg, having screw *f* and socket *g*, fitting down around the spindle-shoulder *b*, as shown and described, for the purpose set forth.

In testimony that I claim the foregoing as my own I have hereto affixed my signature in presence of two witnesses.

LEVI J. RICHARDSON.

Witnesses:
 WILBUR L. WHITNEY,
 EDWARD A. WHITNEY.